(12) United States Patent
Spriestersbach et al.

(10) Patent No.: US 7,383,342 B2
(45) Date of Patent: Jun. 3, 2008

(54) OPERATING A BROWSER TO DISPLAY FIRST AND SECOND VIRTUAL KEYBOARD AREAS THAT THE USER CHANGES DIRECTLY OR INDIRECTLY

(75) Inventors: Axel Spriestersbach, Karlsruhe (DE); William Patrick Tunney, Montreal (CA)

(73) Assignee: SAP Aktiengesellschaft, Walldorf (DE)

( * ) Notice: Subject to any disclaimer, the term of this patent is extended or adjusted under 35 U.S.C. 154(b) by 935 days.

(21) Appl. No.: 10/339,673

(22) Filed: Jan. 10, 2003

(65) Prior Publication Data

US 2003/0154292 A1    Aug. 14, 2003

(30) Foreign Application Priority Data

Jan. 11, 2002  (EP) ................................. 02000675
Dec. 13, 2002  (EP) ................................. 02027945

(51) Int. Cl.
*G06F 15/16* (2006.01)
*G06F 3/02* (2006.01)
*G09G 5/00* (2006.01)

(52) U.S. Cl. ...................... 709/228; 345/168
(58) Field of Classification Search ................ 709/228, 709/218; 345/168–172
See application file for complete search history.

(56) References Cited

U.S. PATENT DOCUMENTS

| | | | |
|---|---|---|---|
| 4,885,580 A | 12/1989 | Noto et al. | |
| 5,276,794 A | 1/1994 | Lamb, Jr. | |
| 5,717,425 A | 2/1998 | Sasaki | |
| 5,812,117 A | 9/1998 | Moon | |
| 5,916,310 A | 6/1999 | McCain | |
| 6,094,197 A | 7/2000 | Buxton et al. | |
| 6,169,538 B1 * | 1/2001 | Nowlan et al. | 345/168 |
| 6,388,657 B1 * | 5/2002 | Natoli | 345/168 |
| 6,661,920 B1 * | 12/2003 | Skinner | 382/187 |
| 6,677,933 B1 * | 1/2004 | Yogaratnam | 345/174 |
| 6,788,815 B2 * | 9/2004 | Lui et al. | 382/187 |
| 7,051,080 B1 * | 5/2006 | Paul et al. | 709/217 |

FOREIGN PATENT DOCUMENTS

| | | |
|---|---|---|
| DE | 19636953 C1 | 1/1998 |
| EP | 0464712 A2 | 1/1992 |
| EP | 0271280 | 9/1996 |
| WO | WO99/14657 | 8/1999 |

* cited by examiner

*Primary Examiner*—John B. Walsh
(74) *Attorney, Agent, or Firm*—Fish & Richardson P.C.

(57) ABSTRACT

Operating a browser that interprets a markup page and thereby displays a virtual keyboard (350) to a user. The operation comprises: displaying (405) a first keyboard area (350); presenting (410) first and second input fields of first and second input types, respectively, to the user; selecting (420) an input field by relating an input device to either the first input field or the second input field; displaying (430) a second keyboard area corresponding to the type of the selected input field; reading (430) input from the user from the first keyboard area and from the second keyboard area to the selected field; and changing (450) the first keyboard area according to user commands to a keyboard selector.

10 Claims, 8 Drawing Sheets

303

304

STATE OF AREA 350

STATE OF AREA 360

OPERATING A BROWSER TO DISPLAY FIRST AND SECOND VIRTUAL KEYBOARD AREAS THAT THE USER CHANGES DIRECTLY OR INDIRECTLY

CROSS-REFERENCE TO RELATED APPLICATIONS

This application claims priority from European patent application number EP 02000675 filed Jan. 11, 2002 and EP 02027945.1 filed Dec. 13, 2002, both of which are incorporated herein by reference.

FIELD OF THE INVENTION

The present invention generally relates to data processing and, more particularly, relates to computer methods, programs and systems that interact with the users through browsers.

BACKGROUND OF THE INVENTION

Desktop or laptop computers have complete keyboards with keys for letters (e.g., arranged as QWERTY or QWERTZ), numbers (e.g., 0 . . . 9), special characters for email communication and currencies (e.g., @, $, €) and other symbols. Smaller computers, such as personal digital assistants (PDA) or mobile phones have a limited number of keys or emulate the keyboard on screen. Often there is not enough space for displaying all symbols. Users have to operate the computer for toggling between different keyboard modes. This is however inconvenient. Further, users stay in a confusing conflict situation: Sometimes, the users have to toggle the keyboard and other times, the users have to keep the keyboard unchanged.

The problem remains when the computer interacts with the users through a browser.

There is an ongoing need to provide improvements to computer methods, programs and system that alleviate these and other disadvantages of the prior art.

SUMMARY OF THE INVENTION

The present invention solves the conflict situation for cases where the user enters characters to particular input fields. The user can switch the character sets for a first keyboard area, wherein the character set for a second keyboard area is related to the particular input field. The first keyboard area is dedicated for general characters like letters that occur in all input fields; the second area is dedicated for special characters for the particular input field.

Both areas can have similar looking buttons; in other words, there is no need to tell the user that—technically—the areas behave differently. The user intuitively operates buttons without having the awareness of different areas.

The user retains full control over the first keyboard area at any time and can change the keys directly by a keyboard selector. The user has limited control over the second keyboard area; the user changes the keys indirectly depending on his/her choice of the input field.

Preventing direct changes to the second keyboard area is an advantage and ensures that characters that are displayed provide maximum support of the selected input field.

Preferably, both areas are displayed simultaneously and in separate geometries. In an optimized character-to-area distribution, the first area is the "large" area for displaying a large number of general characters (e.g., letters) and the second area is the "small" area for displaying a few special characters (e.g., special symbols for a currency input field).

Optionally, both areas can be displayed in combination. For example, depending on the natural language for the input field, some language specific characters might be needed: an English keyboard might be extended with a "Ä Ö Ü" (i.e. A O U umlaut, diacritical two-dot marks) for input fields in German. In terms of first and second keyboards, the "A O U umlaut" is the second area.

In other words, properties of input objects (e.g., input fields) control first and second areas of virtual keyboards. User selection directly and explicitly determines the appearance of a first area; object types indirectly and implicitly determine the appearance of a second area. This improves data input for virtual keyboards.

The present invention relates to a method for operating a browser that interprets a markup page and thereby displays a virtual keyboard to a user; the method comprises displaying a first keyboard area; presenting first and second input fields of first and second types, respectively, to the user; receiving a selection for an input field by the user by relating an input device to either the first input field or the second input field; displaying a second keyboard area corresponding to the type of the selected input field while continuing to display the first keyboard area; reading input from the user from the first keyboard area and from the second keyboard area; and changing the first keyboard area according to user commands to a keyboard selector while maintaining the possibility to repeat steps receiving the selection, displaying the second keyboard area and reading.

Preferably, the page is encoded in a markup language selected from the group of HTML, XML, WML.

Preferably, receiving a selection for an input field comprises to monitor a cursor going over the input fields.

Preferably, the steps displaying first area and changing are repeated in a first loop, and wherein steps selecting and displaying second area are repeated in a second loop.

Preferably, the displaying steps comprise displaying keyboard areas with similar buttons.

Preferably, in the displaying steps, the number of character buttons in the first keyboard area is larger than the number of character buttons in the second keyboard area.

Preferably, the geometric dimension of the first keyboard area is larger than the geometric dimension of the second keyboard area.

Preferably, the browser keeps states for the first keyboard area and/or the second keyboard area, wherein transitions between the states for the first keyboard area are controlled during step changing and wherein transitions between the states for the second keyboard area are controlled during step receiving a selection.

The present invention also relates to a server computer that generates a page having computer instructions to perform the method.

The present invention also relates to a markup page with instructions to a browser that controls a computer processor to display a virtual keyboard on a screen. The instructions comprise: instructions for displaying a first keyboard area; instructions for presenting first and second input fields of first and second types, respectively, to the user; instructions for receiving a selection for an input field by the user by relating an input device to either the first input field or the second input field; instructions for displaying a second keyboard area corresponding to the type of the selected input field while continuing to display the first keyboard area; instructions for reading input from the user from the first keyboard area and from the second keyboard area; and instructions for changing the first keyboard area according to user commands to a keyboard selector while maintaining the possibility to repeat steps receiving the selection, displaying the second keyboard area and reading.

The present invention also relates to a computer program product for controlling a virtual keyboard with a first area and a second area on a screen and for inputting data into a first input field of a first type and into a second input field of a second type. The product has first loop instructions and second loop instructions. The product is characterized in that the first loop instructions have instructions for displaying the first keyboard area and for changing the first keyboard area according to user commands to keyboard selector, an in that the second loop instructions have instructions for detecting the selection of an input field by the user for displaying the second area corresponding to the type of the selected input field.

COMPUTER SYSTEM IN GENERAL

Figure 1:
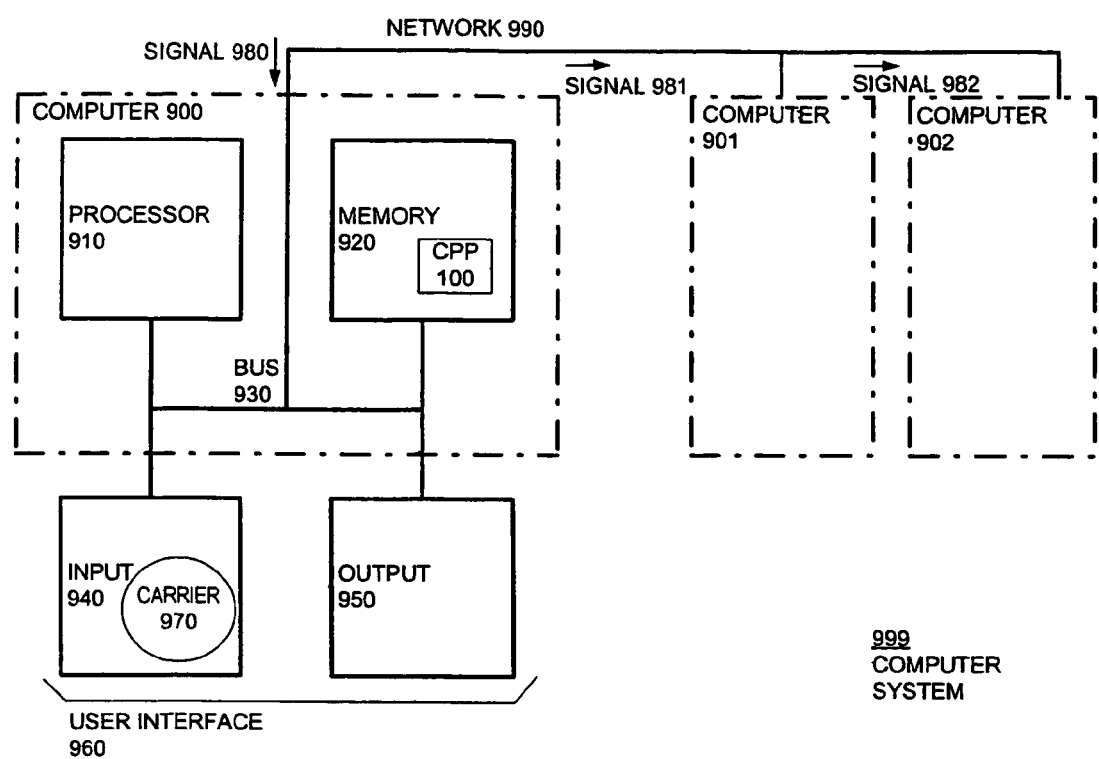
FIG. 1 illustrates a simplified block diagram of a computer network system having a plurality of computers.

FIG. 1 illustrates a simplified block diagram of exemplary computer system 999 having a plurality of computers 900, 901, 902 (or even more).

Computer 900 can communicate with computers 901 and 902 over network 990. Computer 900 has a processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device). Output device 950 can communicate with the user, but it can also communicate with further computers.

Input device 940 and output device 950 can be combined to a single device. Any device 940 and 950 can be provided optionally.

Bus 930 and network 990 provide logical and physical connections by conveying instruction and data signals. While connections inside computer 900 are conveniently referred to as "bus 930", connections between computers 900–902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

DETAILED DESCRIPTION OF A PREFERRED IMPLEMENTATION

Figure 2:
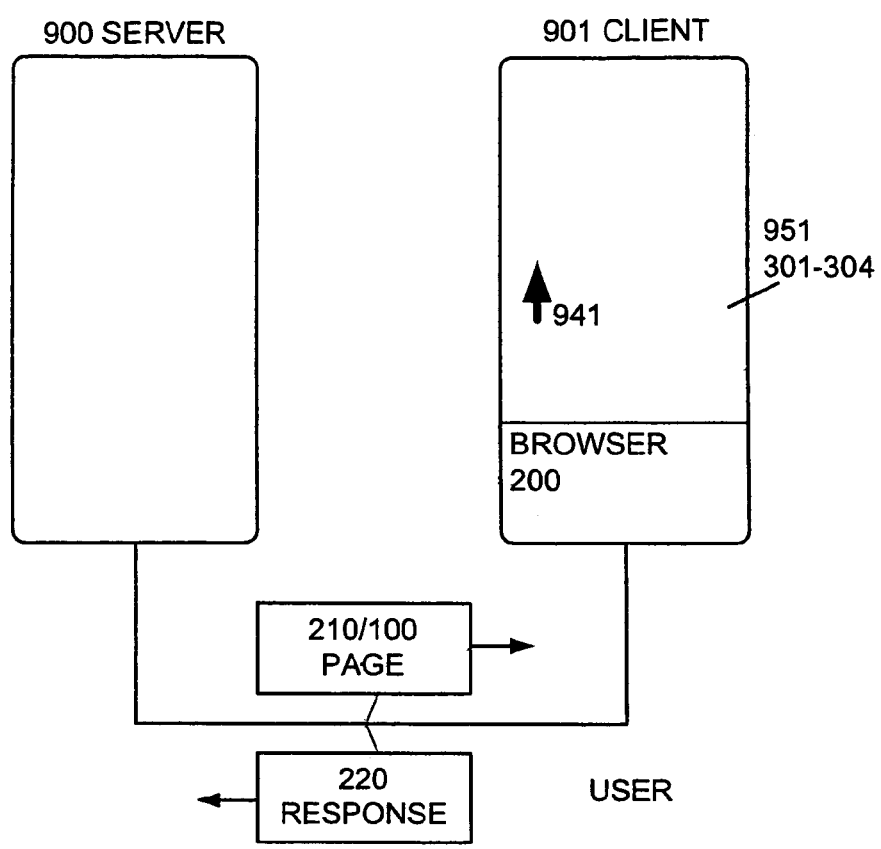
FIG. 2 illustrates a server computer and a client computer of the system of FIG. 1 in an exemplary scenario.

FIG. 2 illustrates server computer 900 and client computer 901 of the system of FIG. 1 in an exemplary scenario. Server computer 900 and client computer 901 communicate via TCP/IP, WAP or via other protocol. Client computer 901 runs browser 200 that is commercially available.

As indicated by an arrow, server computer 900 sends page 210 encoded in markup language (e.g., HTML, XML, WML, "markup page") to client computer 901. Page 210 has CPP 100 to operate browser 200 according to a method of the present invention. In operation, computer 901 presents presentations 301–304 with changing virtual keyboard areas to the user. The user operates input device 941 (e.g., cursor on screen) to provide response 220 to server computer 900 (arrow).

In the example, the user operates keys to input the address "Q@Y.de" and the monetary value "€10". An exemplary HTML-page is explained at the end of the description.

Figure 3:
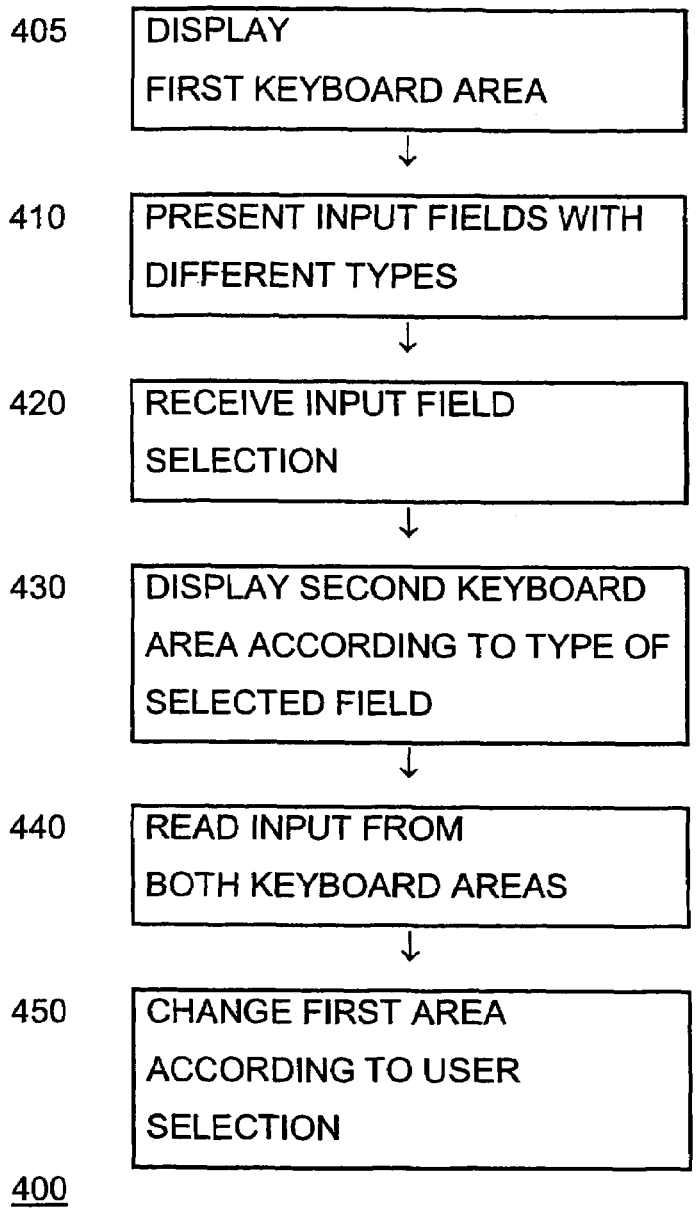
FIG. 3 illustrates a simplified flowchart of a method of the present invention.

FIG. 3 illustrates a simplified flowchart of method 400 of the present invention. Method 400 is a method for operating browser 200 that interprets markup page 210 and thereby displays 405 virtual keyboard 350/360 to a user.

In step displaying 405, browser 200 displays first keyboard area 350.

In step presenting 410, browser 200 presents first input field 310 of first type (e.g., EMAIL) and second input field 320 of second type (e.g., VALUE) to the user.

In step receiving selection 420, browser 200 receives a user selection for input field 310/320 by relating input device 941 to either first input field 310 or second input field 320 (e.g., monitoring a cursor going over input field 310 or 320).

In step displaying 430, browser 200 displays second keyboard area 360 corresponding to the type of selected input field 310/320 (e.g., area with email characters or with currency characters).

In step reading 440, browser 200 reads input from the user from first keyboard area 350 and from second keyboard area 360 (preferably, also presenting the input in selected field 310/320); and In step changing 450, browser 200 changes first keyboard area 350 according to user commands to keyboard selector 370.

In step displaying 405, browser 200 continues to display first keyboard area 350; in step displaying 430, browser 200 maintains the possibility to repeat steps receiving selection 420, displaying 430 second keyboard area 360 and reading 440.

Preferably, page 210 is in a markup language selected from the group of HTML, XML, WML.

Figure 4:
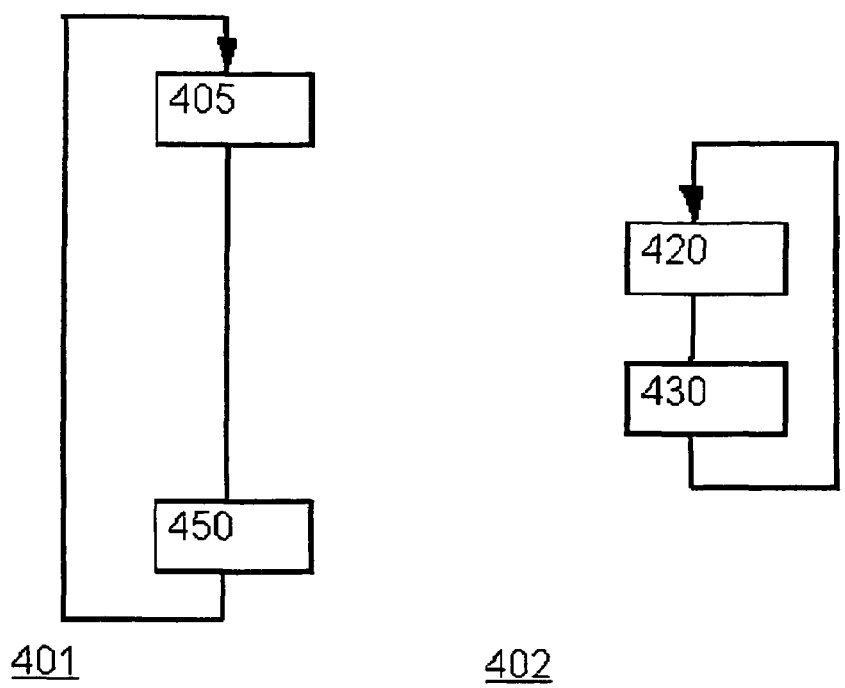
FIG. 4 illustrates an implementation of the method of FIG. 3.

FIG. 4 illustrates of the method in a further implementation. Preferably, the steps displaying first area 405 and changing 450 are repeated in first loop 401, and steps receiving selection 420 and displaying second area 430 are repeated in second loop 402. This allows the user to choose the most suitable keyboard appearance at any time. Both repetitions are independent from each other.

FIGS. 5–8 illustrate consecutive browser presentations 301–304 for the example scenario. Preferably, the scenario has headlines, submit buttons, keys for A to Z and the like. As illustrated, the presentations have first input field 310 ("EMAIL"), second input field 320 ("VALUE") optional third input field 330 ("PHONE"), virtual keyboard 350/360 with first area 350 and second area 360, and keyboard selector 370. Where appropriate, suffixes -1 and -2 distinguish different states. Selector 370 has button "ABC" for switching area 350 to QWERTY, button "123" for switching area 350 to numbers, and button "@%&" for switching area 350 to special characters.

Figure 5:
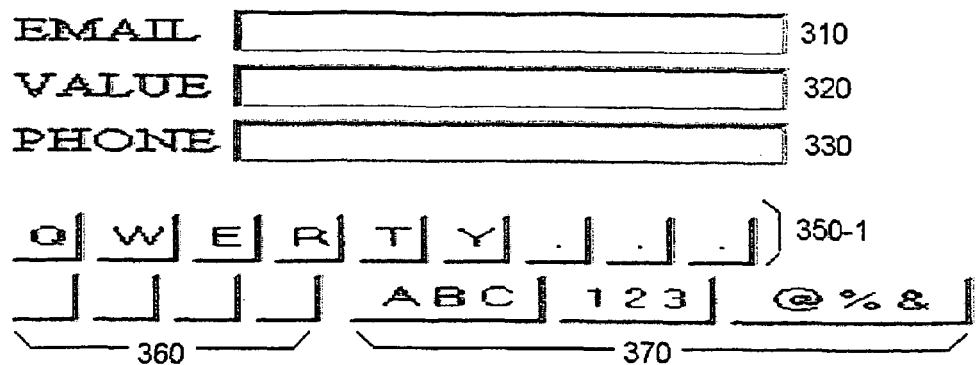
FIGS. 5–8 illustrate consecutive browser presentations for the example scenario.

FIG. 5 illustrates first presentation 301 having fields 310, 320 and 330 (still empty, present 410) as well as areas 350-1 and 360 in initial state (display 405). Area 350-1 has the initial state ("configuration") QWERTY.

Figure 6:
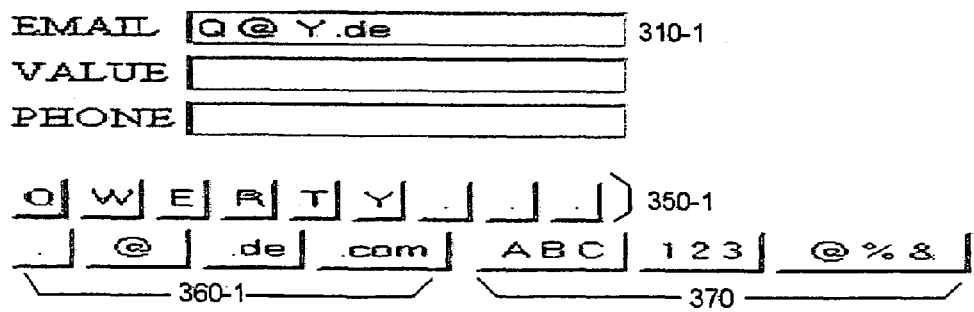

FIG. 6 illustrates second presentation 302. The user has selected (step 420) first input field 310. Browser 200 therefore displays second area 360 in the corresponding state 360-1 with special characters suitable for email input (e.g., period, @, top-level domains, etc.). Also, the user has operated key "Q" of area 350-1, key "@" of area 360-1, key "Y" of area 350-1 and key ".de" of area 360-1. Browser 200 has read this key operations to input field 310 (Q@Y.de, 310-1).

Figure 7:
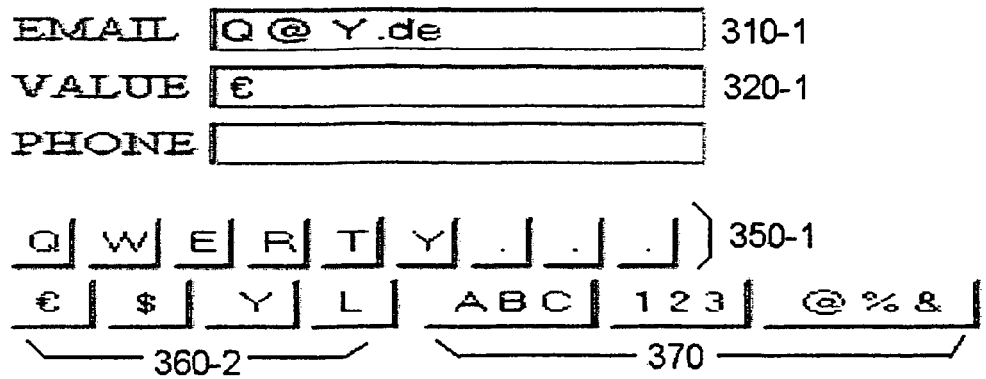

FIG. 7 illustrates third presentation 303. In repetition of step 420, the user has selected second input field 320. Browser 200 has displayed second area 360-2 accordingly with currency symbols (e.g., for Euro, US-Dollar, Yen, British Pound), the user has operated "€" and browser 200 reads the symbol "€" into field 320-1.

With first area 350-1 still in QWERTY, the user is still unable to input numbers. The user therefore operates the "123" button of selector 370.

Figure 8:
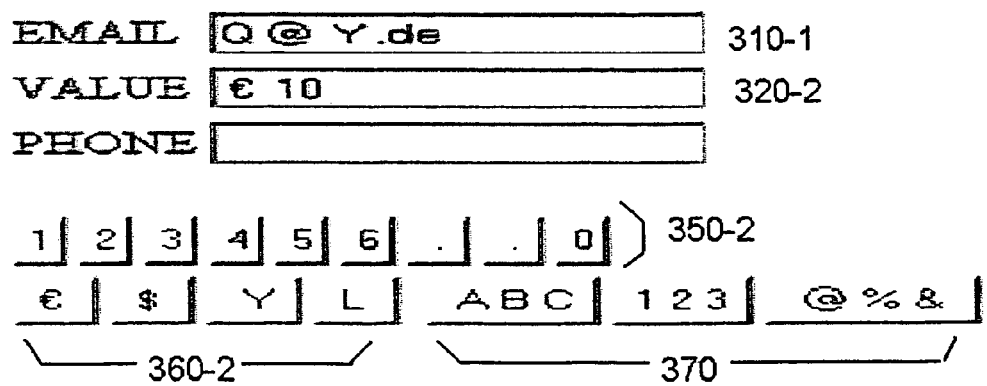

FIG. 8 illustrates fourth presentation 304. As in step 450, the user has changed first area 350 to numbers and has operated keys 1 and 0 in area 350-2. Browser 200 has read this number 10 into field 320-2. The other fields and areas remain unchanged.

Operating selector 370 (step 450) is possible all the time. The order by that the user selects the fields (step 420) is not important.

Figure 9:
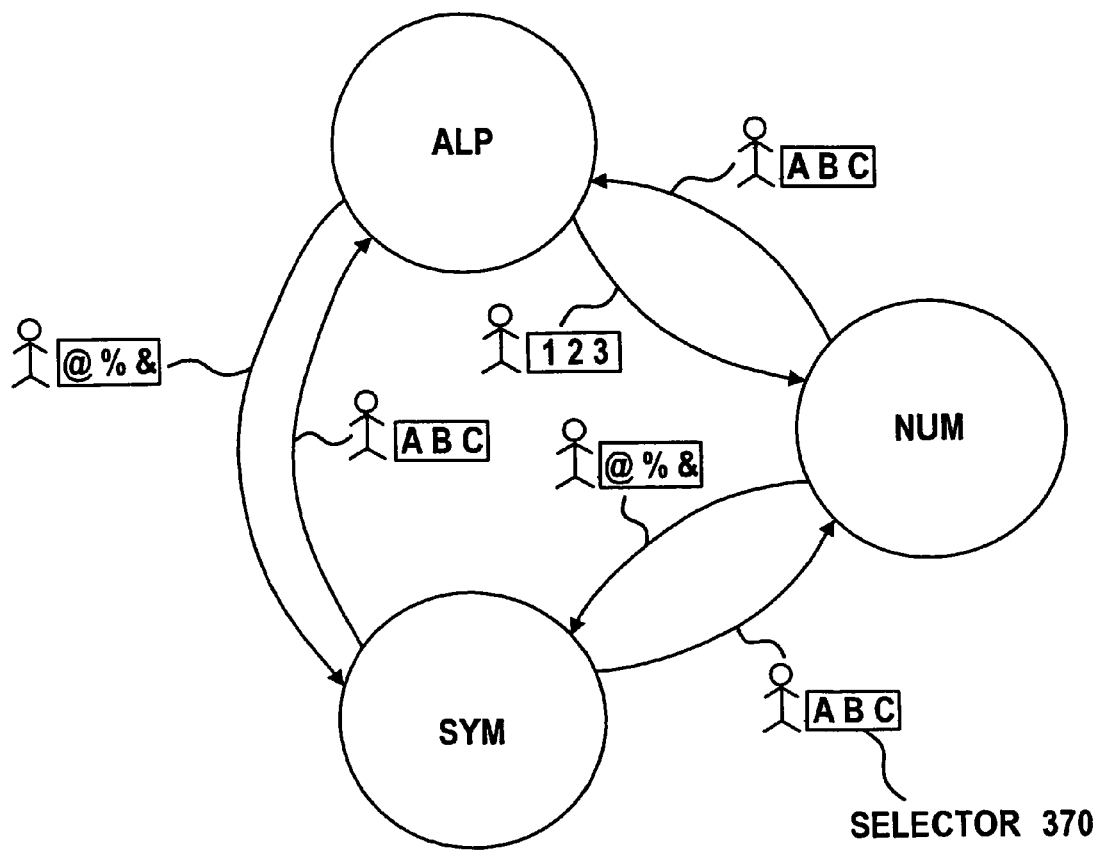
FIGS. 9–10 illustrate state diagrams for the first and second keyboard areas in the browser presentations and for state transitions that are invoked by the user either directly or indirectly.
Figure 10:
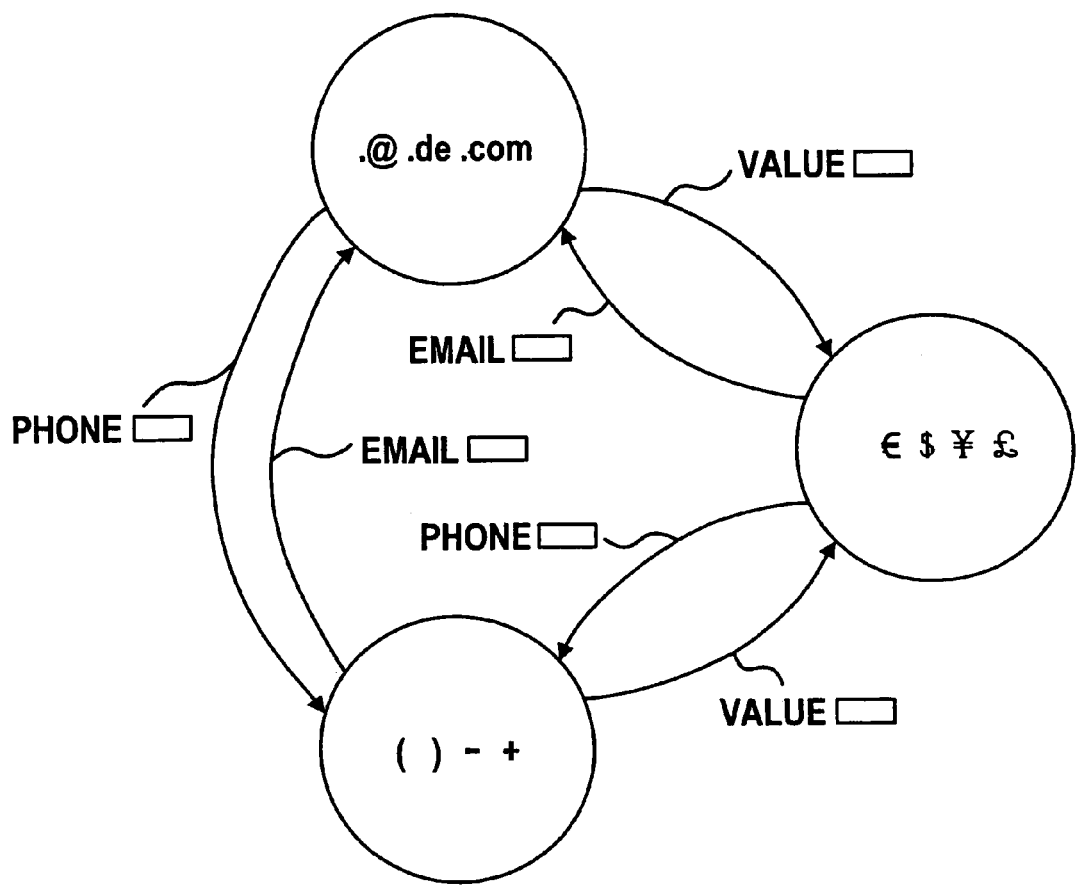

FIGS. 9–10 illustrate state diagrams for keyboard areas 350 and 360 in the browser presentations and for state transitions that are invoked by the user either directly (i.e. area 350 via selector 370) or indirectly (i.e. area 360 via input field).

For area 350, the exemplary implementation uses the 3 states alpha/QUERTY, numeric and symbols. The transitions are directly controlled by the user who operates selector 370.

For area 360, the exemplary implementation uses the 3 states ".@.de.com", "( )–+" and Euro/Dollar/Yen/Pound, that correspond to the 3 input fields and that are indirectly controlled by the user who selects the input field (cf. fields 310/320/330).

In the exemplary implementation, states and transitions for area 350 are independent from states and transitions for area 360. Therefore, the browser can display areas 350 and 360 simultaneously and can display area combinations according to all 3×3=9 states.

Optionally, the following implementations are proposed:

Server computer 900 and client computer 901 communicate via Wireless Application Protocol (WAP). The present invention allows displaying special characters that that required for predefined input objects. Input device 941 is not necessarily the cursor but can be an input pen or even a voice command. Definitions of character sets, for example, definitions for the arrays can be defined by XML.

Switching between different natural language can be supported as well. This is convenient, for example, in translation applications that interact with the user via different character sets (e.g., English and Russian). Instead of symbols, predefined words can be displayed (e.g., currency EUR for €, USD for $, but less space saving).

Selector 370 can save the button for its current state. This features saves further space. Operating the button for the current state would just confirm the current state. For example, selector 370 in state "num" needs to only to display buttons for "ABC" and "@%&", but does not need to display button "123". The same principle applies for the other buttons.

It is an advantage that indirectly controlling area 360 (via input fields) already prevents displaying superfluous buttons.

Exemplary HTML-page

The following code is an example for page 210. Persons of skill in the art can introduce modifications without departing from the scope of the invention.

The code starts with declarations, for example:
<html>
<head>
</head>
<body>.

The code continues with instructions to present input fields (cf. step 410), for example for field 310:
<table>
<td>EMAIL </td>
<td>
<input datatype="first_type" type="text" onFocus="focusChange( )"/>
</td>
</table>.

Similar statements are provided for fields 320 and 330.

Java script declarations with function calls follow, for example:
<script type="text/javascript">var current_focus; init( ); display_keyboards( ).

The functions are defined in the following. Area 350 is defined for 3 states (alpha/QWERTY, numeric, symbols). The initial state is alpha/QWERTY. Area 360 is defined to be initially empty (cf. 301, step 405):
function init( )
keyboard_alp=
new Array
("Q", "W", "E", "R", "T", "Y", ".", ".", ".");
keyboard_num=
new Array
("1", "2", "3", "4", "5", ".", ".", "0");
keyboard_sym=
new Array
(".", ".", "€", "$", "/", ",", ".", ".", "@"); second_keyboard=
new Array
(" ", " ", " ", " ", " ");
current_first_keyboard=keyboard_alp.

The following functions are instructions for step 450. Global variable "current_first_keyboard" defines first area 350, for example:
function focusChange( ) var key=event.srcElement.datatype;
current_focus=event.srcElement; change_second_keyboard (key)
function mode( ) var key=event.srcElement.id;
if (key=='alp') {current_first_keyboard=keyboard_alp;}
if (key=='sym') {current_first_keyboard=keyboard_sym;}
if (key=='num') {current_first_keyboard=keyboard_num;}
display_keyboards( ).

The following instructions display the symbols of the keys that are operated by the user:
function pressed( )
var key=event.srcElement.value;
current_focus.value=current_focus.value+key.

The following function is code for step 430. The types of input fields 310, 320 and 330 are referred to as first, second and third type, respectively, for example:
function change_second_keyboard(key)
{if (key=='first_type') second_keyboard=
new Array (".", "@", ".de", ".com");
if (key=='second_type') second_keyboard=
new Array ("€", "$", "Y", "L");
if (key=='third type') second_keyboard=
new Array ("(",")", "–", "+").

Displaying both areas follows (used in steps 405, 430, 450), for example:
display_keyboards( ).

Displaying and changing keyboards (steps 405, 430, 450) also comprises to remove previous keyboards:
function display_keyboards( ) var current;
var i=0;
var node=document.getElementById("keyboard");
if (node) node.parentElement.removeChild(node).

Displaying first area 350 conveniently uses tables and counters through all array elements, for example:
var x=document.createElement('p');

```
x.id='keyboard';
document.body.appendChild(x);
var table=document.createElement('table'); x.appendChild
    (table);
var tablebody=document.createElement('tbody'); table.ap-
    pendChild(tablebody);
var tr=document.createElement('tr');
var input, td;
while (i<current_first_keyboard.length);
td=document.createElement('td');
input=document.createElement('input');
    input.type='button';
input.value=current_first_keyboard[i];    input.attachEvent
    ("onclick", pressed);
input.id='button';
input.name='button';
td.appendChild(input);
tr.appendChild(td);
i++;
tablebody.appendChild(tr).
```

Second area 360 is displayed similarly:

```
table=document.createElement('table');    x.appendChild
    (table);
tablebody=document.createElement('tbody'); table.append-
    Child(tablebody);
tr=document.createElement('tr');
i=0;
while (i<second_keyboard.length)
d=document.createElement('<td>');
input=document.createElement('input');
    input.type='button';
input.value=second_keyboard[i];    input.attachEvent("on-
    click", pressed);
input.id='button';
input.name='button';
td.appendChild(input);
tr.appendChild(td);
i++;
td=document.createElement('<td></td>');    tr.appendChild
    (td).
```

The following is code for selector 370, for example:

```
td=document.createElement('<td>');
input=document.createElement('input');
    input.type='button';
input.id='alp';
input.value='A B C';
input.attachEvent("onclick", mode); td.appendChild(input);
tr.appendChild(td).
```

Similar statements are provided for buttons '1 2 3' and '@%&'.

The code closes with </script> and </body>

REFERENCE NUMBERS

-1, -2 suffix to distinguish states
100 CPP
200 Browser
210 markup page
220 Response
301–304 presentation
350 first keyboard area
360 second keyboard area
370 keyboard selector
400 Method
401 first loop
402 second loop
4xx method steps
900 server computer
901 client computer
920 Memory
930 Bus
940 input device
941 pen, cursor on screen
950 output device
951 Screen
960 user interface
970 program carrier
980 program signal
990 network
999 system

What is claimed is:

1. A computer-implemented method comprising:
displaying first and second independently-changeable keyboard areas simultaneously;
displaying a keyboard selector;
receiving a user selection indicative of alphabetic characters, numeric characters, or symbolic characters via the keyboard selector;
displaying controls in the first keyboard area which allow an input of alphabetic characters, numeric characters, and symbolic characters, based upon the user selection indicative of alphabetic characters, numeric characters, or symbolic characters;
displaying first and second input fields, each input field associated with electronic mail characters, currency characters, or symbolic characters;
receiving a user selection of the first or second input field; and
displaying controls in the second keyboard area which allow the input of electronic mail characters, currency characters, or symbolic characters, based upon the user selection of the first or second input field.

2. The method of claim 1, further comprising:
receiving a page encoded in a markup language; and
interpreting the page such that the first and second keyboard areas are displayed.

3. The method of claim 1, wherein receiving a user selection of the first or second input field comprises monitoring for an input in the first and second input fields.

4. The method of claim 1 wherein the controls allowing input of electronic mail characters include more than one character within the control.

5. The method of claim 1, wherein the the first and second keyboard areas include controls which allow the input of the same symbolic character.

6. The method of claim 1, wherein a larger number of controls are displayed in the first keyboard area than in the second keyboard area.

7. The method of claim 1 wherein the first keyboard area is geometrically larger than the second keyboard area.

8. The method of claim 1, wherein the keyboard selector receives indirect user input from an input field of a form.

9. The method of claim 1, wherein the keyboard selector receives direct user input.

10. A computer program product tangibly stored on a computer-readable medium, the product comprising instructions to be performed by a computer, the instructions operable to cause a programmable processor to:
display first and second independently-changeable keyboard areas simultaneously;
display a keyboard selector;
receive a user selection indicative of alphabetic characters, numeric characters, or symbolic characters via the keyboard selector;

display controls in the first keyboard area which allow an input of alphabetic characters, numeric characters, and symbolic characters, the controls based on the user selection indicative of alphabetic characters, numeric characters, or symbolic characters;

display first and second input fields, each input field associated with electronic mail characters, currency characters, or symbolic characters;

receive a user selection of the first or second input field; and display controls in the second keyboard area which allow the input of electronic mail, currency characters, or symbolic characters, the controls based upon the user selection of the first or second input field.

* * * * *